United States Patent
Flansburg et al.

(10) Patent No.: US 9,023,456 B2
(45) Date of Patent: May 5, 2015

(54) PROFILED WIRE SCREEN FOR PROCESS FLOW AND OTHER APPLICATIONS

(75) Inventors: Charles Flansburg, Andover, MN (US); Chad Mrazek, Ramsey, MN (US); Michael Ekholm, Minneapolis, MN (US); David Mattsen, Ramsey, MN (US)

(73) Assignee: Bilfinger Water Technologies, Inc., New Brighton, MN (US)

( * ) Notice: Subject to any disclaimer, the term of this patent is extended or adjusted under 35 U.S.C. 154(b) by 38 days.

(21) Appl. No.: 13/420,198

(22) Filed: Mar. 14, 2012

(65) Prior Publication Data
US 2012/0237727 A1    Sep. 20, 2012

Related U.S. Application Data

(60) Provisional application No. 61/454,381, filed on Mar. 18, 2011.

(51) Int. Cl.
*B07B 1/18* (2006.01)
*B01D 29/44* (2006.01)
(Continued)

(52) U.S. Cl.
CPC ............... *B07B 1/18* (2013.01); *B01D 29/445* (2013.01); *B07B 1/4618* (2013.01); *B01D 29/111* (2013.01); *B01D 29/33* (2013.01); *B01D 29/48* (2013.01); *B07B 1/4609* (2013.01); *B07B 1/4654* (2013.01); *B01D 2201/60* (2013.01)

(58) Field of Classification Search
CPC .... B01D 29/445; B01D 29/48; B01D 29/035; B01D 29/072; B01D 29/073; B01D 29/111; D21D 5/16; B07B 1/4618; B07B 1/18
USPC ............................................ 209/392; 29/428
See application file for complete search history.

(56) References Cited

U.S. PATENT DOCUMENTS 2,046,458 A    11/1934    Johnson
2,146,816 A    2/1939    Grassby
(Continued)

FOREIGN PATENT DOCUMENTS

CA    2178683    4/1997
EP    0893536    1/1999
(Continued)

OTHER PUBLICATIONS

Profile Wire Screens Product Sheet, May 9, 2008, http://www.wedgewire.com/wedgewirescreens.pdf.*
(Continued)

*Primary Examiner* — Aaron Austin
*Assistant Examiner* — Jasper Saberi
(74) *Attorney, Agent, or Firm* — Moore & Van Allen, PLLC

(57) ABSTRACT

A screen has a plurality of rods arranged longitudinally around a central axis. The rods have first and second edges (e.g., inner and outer edges). Each of the first edges defines a profile that varies in lateral distances from the central axis along a longitudinal length of the rod. For example, the first edges can have an undulating profile of crests and troughs. With the plurality of rods disposed around the central axis, the profile produces a varied surface on the screen when a plurality of wraps from one or more wires is disposed laterally around rods. These one or more wires attach to the first edges of the rods and form a plurality of gaps.

20 Claims, 12 Drawing Sheets

(51) Int. Cl.
*B07B 1/46* (2006.01)
*B01D 29/11* (2006.01)
*B01D 29/33* (2006.01)
*B01D 29/48* (2006.01)

(56) References Cited

U.S. PATENT DOCUMENTS

| | | | |
|---|---|---|---|
| 2,209,355 A | | 7/1940 | Schmitz |
| 2,389,970 A | | 11/1945 | Ferguson |
| 2,546,335 A | | 3/1951 | Friend |
| 2,749,581 A | | 6/1956 | McCormick |
| 2,906,506 A | | 9/1959 | Barnes et al. |
| 2,973,865 A | * | 3/1961 | Cibula .......... 209/315 |
| 3,014,252 A | | 12/1961 | Norman |
| 3,077,643 A | | 2/1963 | Horner |
| 3,113,356 A | | 12/1963 | Piper |
| 3,238,683 A | | 3/1966 | Maxwell |
| 3,276,942 A | | 10/1966 | Ewing |
| 3,437,538 A | | 4/1969 | Ewing |
| 3,438,167 A | | 4/1969 | Royston |
| 3,941,703 A | | 3/1976 | Binard |
| 3,971,359 A | | 7/1976 | Bourne |
| 4,089,594 A | | 5/1978 | Ewin |
| 4,096,911 A | | 6/1978 | Geske |
| 4,145,855 A | | 3/1979 | Sheldon |
| 4,217,742 A | | 8/1980 | Evans |
| 4,232,731 A | | 11/1980 | Kaplow et al. |
| 4,264,438 A | | 4/1981 | Frejborg |
| 4,265,222 A | | 5/1981 | Kapany et al. |
| 4,276,265 A | | 6/1981 | Gillespie |
| 4,337,754 A | | 7/1982 | Conger |
| 4,374,729 A | | 2/1983 | Frykhult |
| 4,406,326 A | | 9/1983 | Wagner |
| 4,409,960 A | | 10/1983 | Balzer |
| 4,459,975 A | | 7/1984 | Hobart |
| 4,498,455 A | | 2/1985 | Gramm |
| 4,715,358 A | | 12/1987 | Koster |
| 4,819,722 A | | 4/1989 | Daly |
| 4,828,689 A | | 5/1989 | Lamort |
| 4,846,971 A | | 7/1989 | Lamort |
| 5,015,383 A | | 5/1991 | Evans et al. |
| 5,024,771 A | * | 6/1991 | Chiarito .......... 210/791 |
| 5,047,148 A | | 9/1991 | Ariai |
| 5,069,279 A | | 12/1991 | Nagaoka |
| 5,090,721 A | | 2/1992 | Lange |
| 5,094,360 A | | 3/1992 | Lange |
| 5,118,419 A | | 6/1992 | Evans et al. |
| 5,156,738 A | | 10/1992 | Maxson |
| 5,237,154 A | | 8/1993 | Pellhammer et al. |
| 5,255,790 A | | 10/1993 | Einoder et al. |
| 5,295,051 A | | 3/1994 | Cowling |
| 5,353,565 A | | 10/1994 | Tanikawa |
| 5,387,340 A | | 2/1995 | Ackerman |
| 5,411,312 A | | 5/1995 | Stallings |
| 5,511,537 A | | 4/1996 | Hively |
| 5,622,625 A | | 4/1997 | Nagaoka |
| 5,672,101 A | | 9/1997 | Thomas |
| 5,718,826 A | | 2/1998 | Frejborg |
| 5,755,034 A | | 5/1998 | Yasue et al. |
| 5,768,783 A | | 6/1998 | Lange |
| 5,788,860 A | | 8/1998 | Yasue et al. |
| 5,791,495 A | | 8/1998 | Gero et al. |
| 5,954,956 A | | 9/1999 | Lutz et al. |
| 6,047,834 A | | 4/2000 | Dolle et al. |
| 6,056,126 A | | 5/2000 | Schabel et al. |
| 6,089,316 A | | 7/2000 | Spray |
| 6,092,286 A | | 7/2000 | Lange |
| 6,119,867 A | | 9/2000 | Ljokkoi et al. |
| 6,158,175 A | | 12/2000 | Carter |
| 6,239,910 B1 | | 5/2001 | Digert |
| 6,240,999 B1 | | 6/2001 | Koster |
| 6,311,437 B1 | | 11/2001 | Lorenz |
| 6,340,805 B1 | | 1/2002 | Ljokkoi |
| 6,367,937 B2 | | 4/2002 | Koster |
| 6,425,486 B1 | | 7/2002 | Andersson et al. |
| 6,426,003 B2 | | 7/2002 | May et al. |
| 6,430,954 B1 | | 8/2002 | Smith |
| 6,460,757 B1 | | 10/2002 | Ommundsen |
| 6,491,168 B1 | | 12/2002 | Lutz et al. |
| 6,581,589 B1 | | 6/2003 | Fent et al. |
| 6,595,017 B1 | | 7/2003 | Teahan |
| RE38,303 E | | 11/2003 | Askew |
| 6,708,829 B2 | | 3/2004 | Robertson et al. |
| 6,714,352 B2 | | 3/2004 | Rogers et al. |
| 6,761,821 B2 | | 7/2004 | Appel et al. |
| 6,785,964 B2 | | 9/2004 | Raphael |
| 6,851,560 B2 | | 2/2005 | Reig et al. |
| 7,168,570 B2 | | 1/2007 | Frejborg |
| 7,246,468 B2 | | 7/2007 | Forbis |
| 2002/0070181 A1 | * | 6/2002 | Deanda et al. .......... 210/767 |
| 2002/0174671 A1 | | 11/2002 | Wilkinson |
| 2003/0006173 A1 | | 1/2003 | Aikawa |
| 2003/0115754 A1 | | 6/2003 | Raphael |
| 2007/0251092 A1 | * | 11/2007 | Asikainen .......... 29/896.61 |
| 2008/0202703 A1 | | 8/2008 | Edmonds |
| 2009/0183764 A1 | | 7/2009 | Meyer |
| 2009/0255568 A1 | | 10/2009 | Morgan |
| 2009/0320388 A1 | | 12/2009 | Lilli et al. |

FOREIGN PATENT DOCUMENTS

| | | |
|---|---|---|
| JP | 54-105712 | 8/1981 |
| JP | 56-105712 | 8/1981 |
| JP | 63-235588 | 9/1988 |
| JP | 10025869 | 1/1998 |
| JP | 11-156114 | 6/1999 |
| JP | 11-241287 | 9/1999 |
| JP | 2001347108 | 12/2001 |
| JP | 2003010608 | 1/2003 |
| WO | 95/16819 | 6/1995 |
| WO | 97/20104 | 6/1997 |
| WO | 99/22064 | 5/1999 |
| WO | 01/51168 | 7/2001 |

OTHER PUBLICATIONS

Draghici et al, Shaped Wire Spiral Filters Manufacturing Technologies, Apr. 11, 2009, Bd. Bucuresti No. 39, http://www.eng.utoledo.edu/pmmc/issue5-2.pdf.*

Circumscribe Definition, Apr. 25, 2009, Merriam-Webster Online Dictionary, http://www.merriam-webster.com/dictionary/circumscribe.*

Notice of Grounds for Rejection (Office Action ) in counterpart Japanese Patent Appl. No. 2009-037707, dated Oct. 14, 2010.

Product Information Brochure; "Internals for Radial Flow Reactors," Johnson Screens; © 2006; 12 pages.

Product Information Brochure; "Internals for Down Flow Reactors," Johnson Screens; © 2006; 12 pages.

Product Information Brochure; "Innovative Solutions in Screen Technology," Johnson Screens; © 2006 Weatherford; 12 pages.

Examiner's First Report in counterpart Australian Appl. No. 2009203179, dated Sep. 24, 2010.

First Office Action in counterpart Canadian Appl. No. 2,675,262, dated Jun. 21, 2011.

European Search Report regarding corresponding patent application, dated Jun. 22, 2009.

* cited by examiner

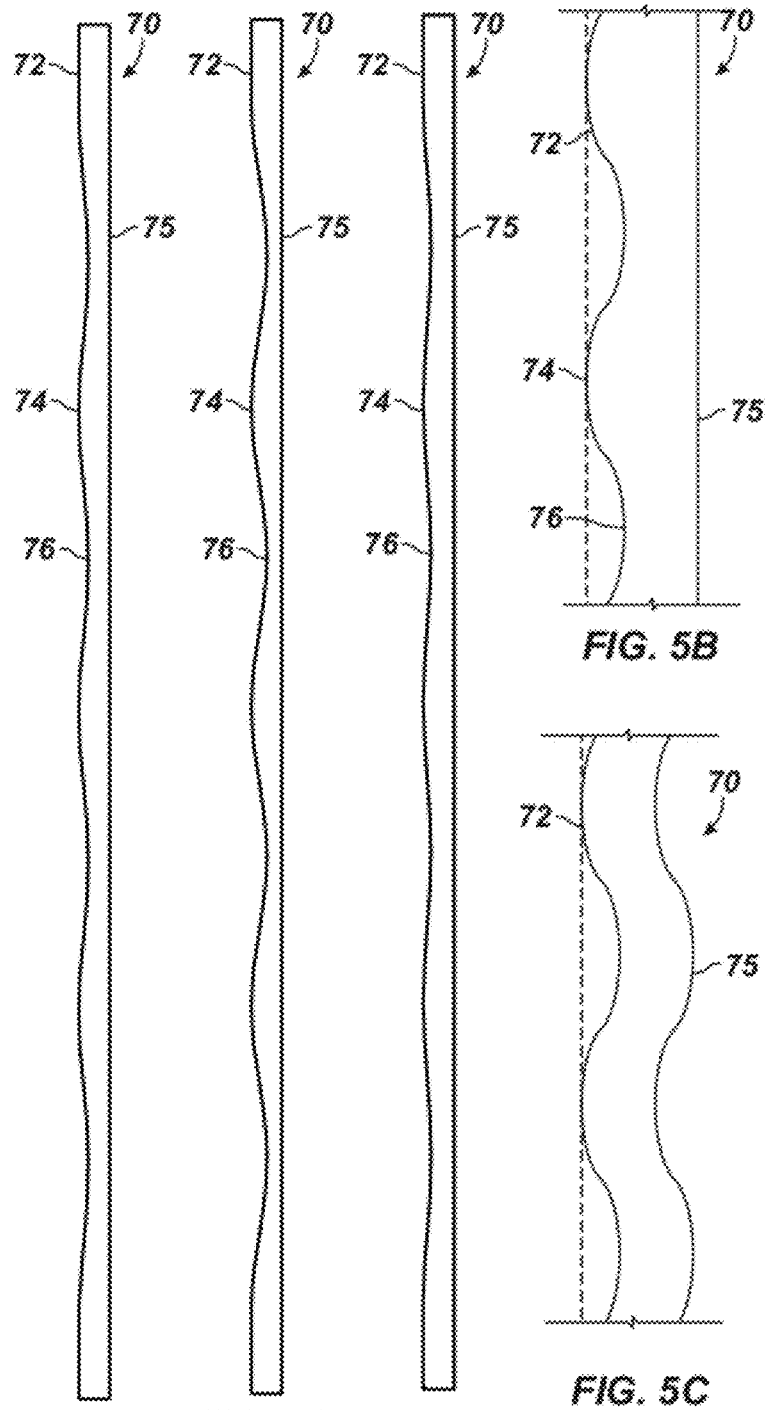
FIG. 5A
FIG. 5B
FIG. 5C
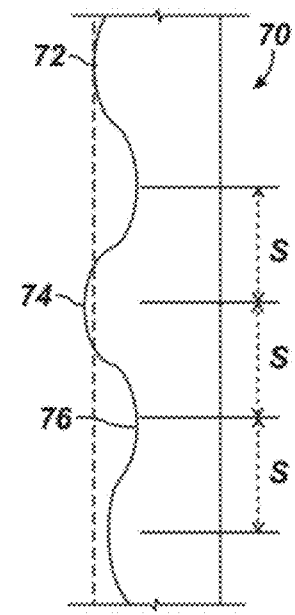
FIG. 5D
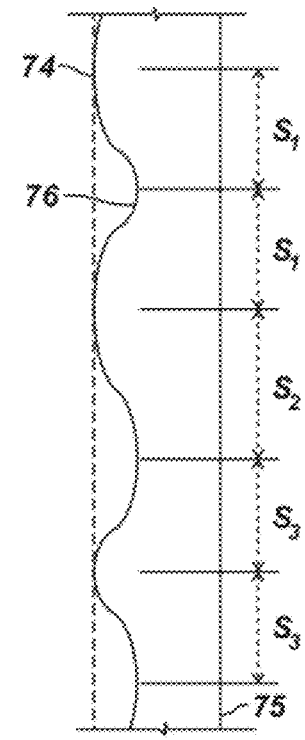
FIG. 5E

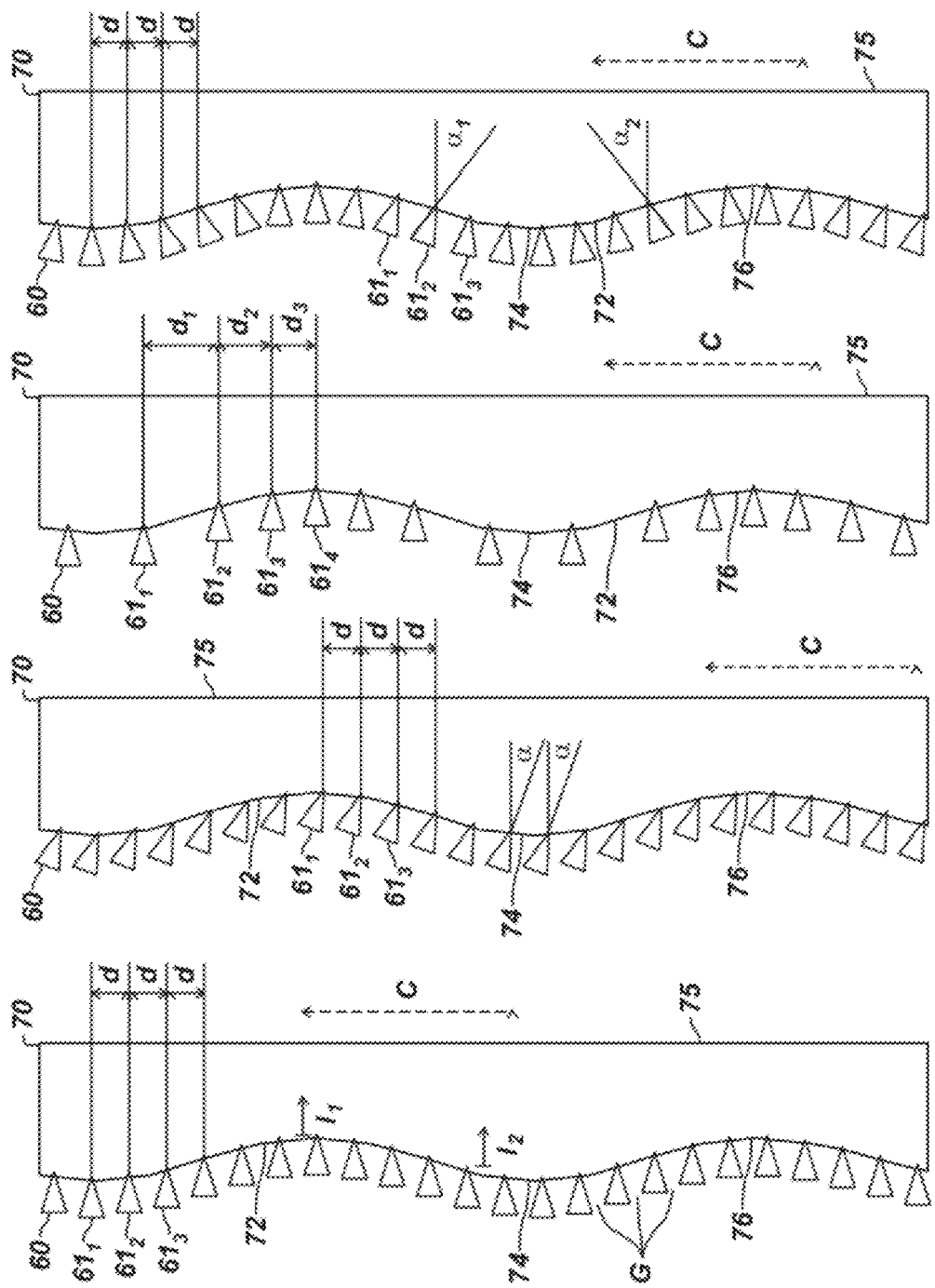

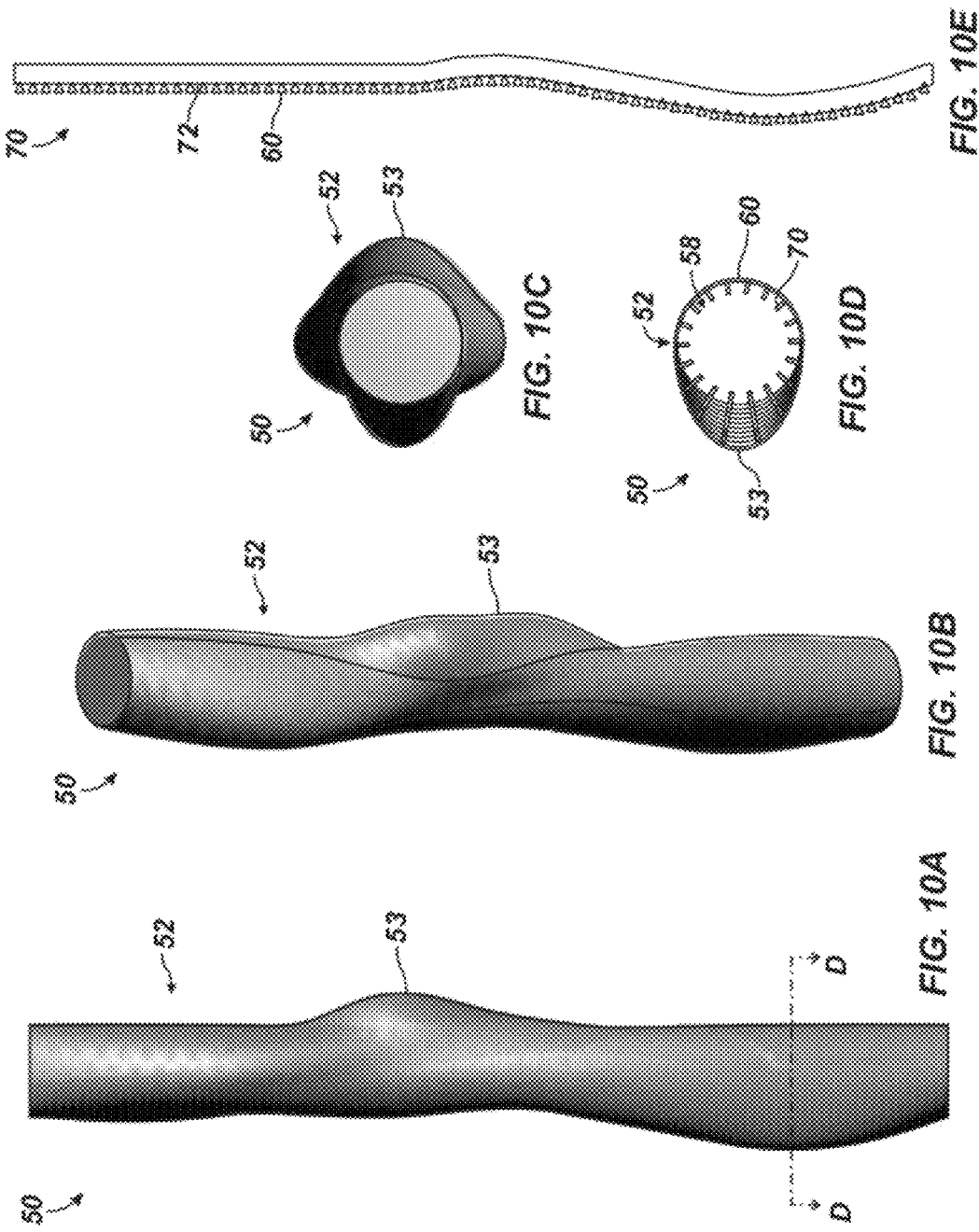

PROFILED WIRE SCREEN FOR PROCESS FLOW AND OTHER APPLICATIONS

CROSS-REFERENCE TO RELATED APPLICATION

This application claims the benefit of U.S. Provisional Appl. No. 61/454,381, filed 18 Mar. 2011, which is incorporated herein by reference in its entirety.

BACKGROUND

Wire screens are used for chemical filtration, architectural accents, downhole tools (e.g., gravel pack screens), and other purposes. FIG. 1 shows the typical construction of a prior art wire screen 10. As shown, the wire screen 10 typically has parallel wires 12 attached by welds 16 to parallel rods 14 oriented perpendicularly thereto. The wires 12 can be V-shaped wires, and the rods 14 can be cylindrical in cross-section as shown, but can also be square, rectangular, etc.

Both the wires 12 and rods 14 are typically made of stainless steel, but they can be made of other materials, including aluminum and copper alloys. In general, attachment of the wires 12 to the rods 14 can be performed by electric resistance welding, binding, or other technique. The wires 12 and rods 14 can be formed in to a screen 10 having a flat shape, a cylindrical shape, or a conical shape in which the screen's diameter gradually changes continuously along the length of the screen. In any of these types of screens, the rods 14 have edges that are linear or straight. In the flat shaped screen, the rods 14 arrange so that their edges lie in a plane. In the cylindrical shape, the rods arrange to form straight sidewalls. In the conical shape, the rods 14 have linear edges and are angled inward toward each other.

In architectural applications, wire screens 10 can be used on a building as a decorative feature for decorative lighting towers, frontages, overhangs, column covers, floor gratings, ventilation grids, wall partitions, handrails, etc. For example, the Seven World Trade Center in New York and the Guthrie Theater parking garage in Minneapolis have wire screens that cover the exterior. Typically, the architectural design of such wire screens focuses on the reflectivity and orientation of the wire surfaces to enhance appearance.

In industrial applications, gaps between the screen's wires 12 can filter chemical compositions, solids, and other media. For example, radial flow assemblies are used in chemical processes such as catalytic reforming, styrene dehydrogenation, ammonia conversion, and the like. In its simplest form, a radial flow assembly has two concentric screens with the annulus filled with treatment media. FIG. 2 shows an example of a typical radial flow reactor vessel 20 for a chemical processing system. The vessel 20 includes a chamber 22 having an outer basket 30 and a centerpipe 40, although a variety of other configurations are known and used.

Both the basket 30 and centerpipe 40 are cylindrical and are composed of wires welded to rods (such as wires 12 and rods shown above in FIG. 1) to form a number of slot openings for filtering the radial process flow. The slot openings on either one or both the centerpipe 40 and outer basket 30 can be oriented vertically to allow media to slide up and down during processing without becoming abraded by edges of the openings. Alternatively, the slot openings can be oriented horizontally along the length of the centerpipe 40 and/or basket 30. Depending on the implementation, the basket 30 and centerpipe 40 may be any height and diameter, and the slot openings between the wires can be as small as 0.010 in. (0.25 mm) and can be increased by to 0.0004 in. (0.01 mm) increments to practically any desired width.

BRIEF DESCRIPTION OF THE DRAWINGS

FIG. 3C shows a first end-section of the wire screen.

FIG. 3D show a second end-section of the wire screen.

FIG. 5A shows vertical rods having an undulating outer edge and a uniform inner edge.

FIG. 5B shows a vertical rod having an outer edge that undulates symmetrically along the length of the rod.

FIG. 5C shows a vertical rod having both inner and outer edges that undulate.

FIG. 5D shows a vertical rod having an outer edge that undulates asymmetrically along the length of the rod.

FIG. 5E shows another vertical rod having an outer edge that undulates asymmetrically along the length of the rod.

FIGS. 6A-6B show wire attached to an undulating or profiled edge of a vertical rod with uniform spacing and horizontal orientation.

FIG. 6C shows wire attached to an undulating edge of a vertical rod with differing spacings and horizontal orientation.

FIG. 6D shows wire attached to an undulating edge of a vertical rod with uniform spacings and differing angular orientations.

FIGS. 10A-10D show elevational, perspective, end, and end-sectional views of another screen according to the present disclosure.

FIG. 10E shows a rod for the screen of FIG. 10A having winds of wire affixed thereto.

DETAILED DESCRIPTION

Figure 3A:
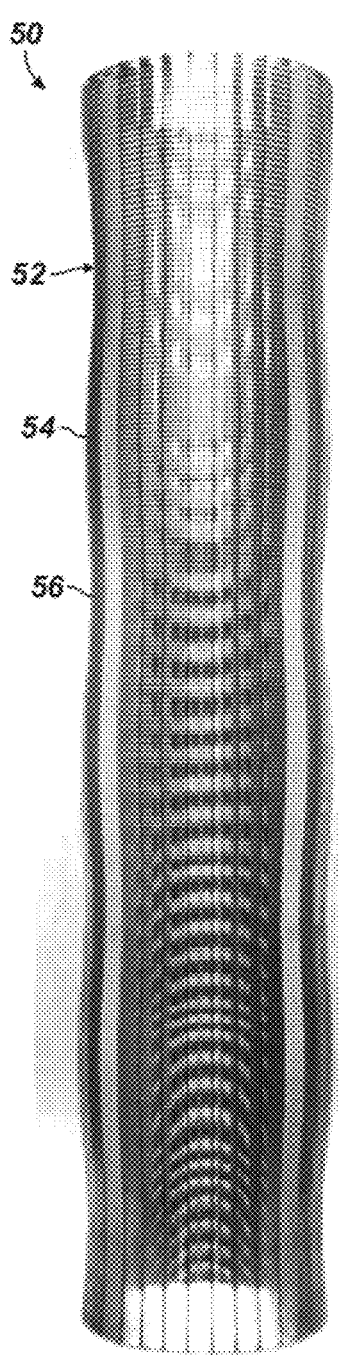
FIG. 3A shows an elevational view of a wire screen according to the present disclosure.
Figure 3B:
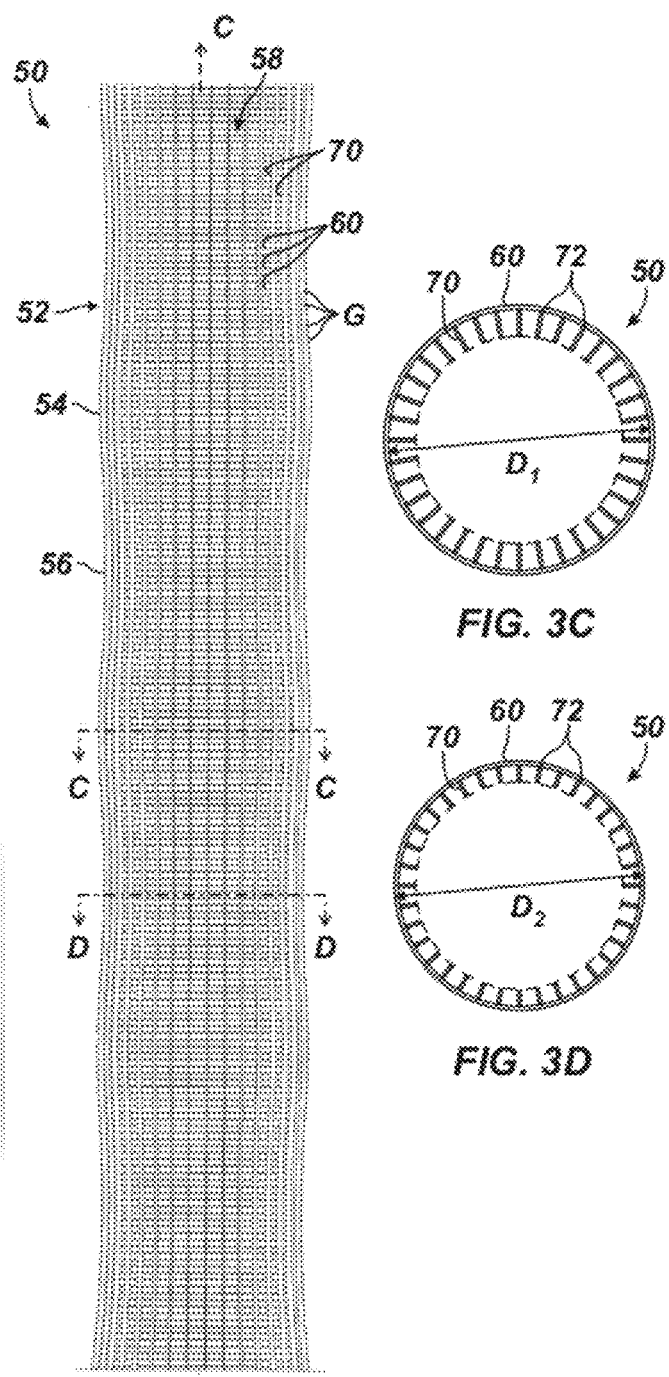
FIG. 3B shows the wire screen in cross-section.

FIG. 3A shows an elevational view of a wire screen 50 according to the present disclosure, and FIG. 3B shows the wire screen 50 in cross-section. FIGS. 3C-3D show two endsections of the wire screen 50 at different points along the screen 50.

The screen 50 has a plurality of rods 70 arranged around a central axis C with one or more wires 60 wound in a plurality of wraps thereabout along a length of the screen 50. The wire 60 can be a continuous wire wound in a spiraling pattern around the arrangement of inner rods 70 along length of the screen 50, or several separate lengths of wire 60 can be wound about the length of the screen 50. Accordingly, the wire 60 as referred to herein can mean one wire or several wires wound with winds or wraps to form the screen's surface or "skin" 52. The rods 70 are described as being vertical or longitudinal, and the wire 60 is described as being horizontal or lateral. This is merely done for convenience because the screen 50 can have any desirable orientation depending on how the screen 50 is to be arranged in an application.

In this screen 50, therefore, the rods 70 are arranged longitudinally around the central axis C with the wire 60 arranged laterally in wraps thereabout. Each of the rod's outer edges 72 has a non-uniform (i.e., non-linear) profile. The non-linear profile of each rod 70 varies in lateral distances from the central axis C along the longitudinal length of the rod 70. The one or more wires 60 wrapped laterally in the plurality of wraps around the central axis C attach to the first edges 72 of the rods 70. The screen's outer surface 52 having an inner passage 58 in this arrangement forms a generally cylindrical shape. Finally, the wire 60 forms various horizontally or laterally arranged gaps G in the screen's surface 52.

Figure 4A:
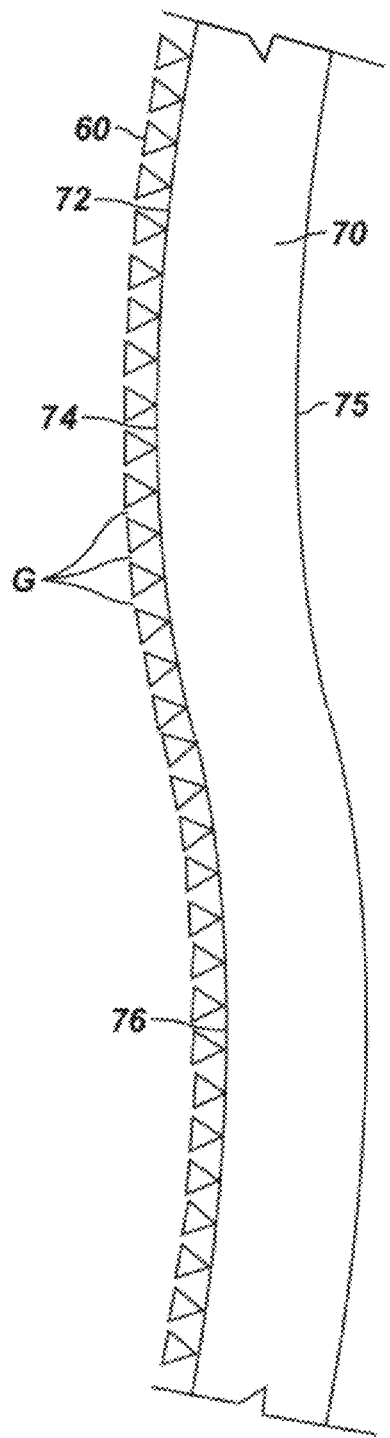
FIGS. 4A-4B shows a side and back view of a rod having wire affixed to its outer edge.
Figure 4B:
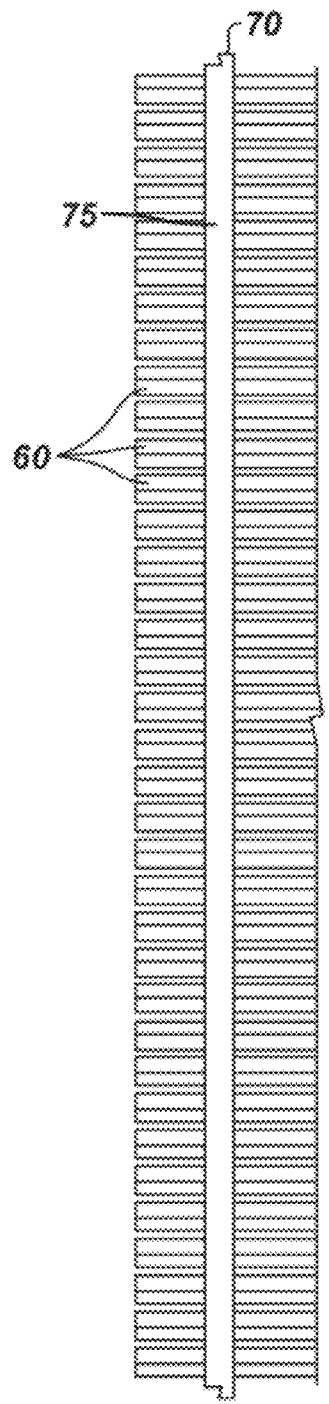

FIGS. 4A-4B schematically show an example of a rod 70 having wire 60 wound and affixed thereto in isolated side and back views. The wire 60 is affixed to the rod's undulating or non-linear outer edge 72, which has various crests 74 and troughs 76 in this arrangement. Spacing between the wires 60 form the gaps G, which can be used for the purposes herein, such as filtering media and the like. In this example, the inner edge 75 of the rod 70, which faces inward in the screen 50 of FIGS. 3A-3D, is also undulating or non-linear, but this is not strictly necessary.

For industrial applications, the gaps G from the wire 60 can filter, limit, or restrict flow either into or out of the screen's inner passage 58. Generally, the wire 60 for industrial and other applications is a Vee-wire with a triangular cross-section (as shown), although other shapes could be used. For the Vee-wire, one vertex of the wire 60 welds to the rods 70, while the other two vertices form the gaps G between the wrappings of the wire 60. For aesthetic or architectural applications, the gaps G from the wire 60 can manipulate lighting, shadow, water flows, or the like in visually compelling ways. The wire 60 for aesthetic applications may or may not be Vee-wire.

Rather than forming a regular cylindrical shape as commonly found in the prior art, the screen's outer surface 52 undulates or curves as shown in FIGS. 3A-3D with various crests 54 of wider diameter $D_1$ and various troughs 56 of narrower diameter $D_2$. Thus, when viewed from a side elevation as in FIG. 3A, the surface 52 of the screen 50 has a profile forming a wave or curve, which may be somewhat sinusoidal as shown. Other variable geometries such as square, zigzagging, peaked, or other shapes are also possible.

As shown in FIGS. 3A-3B, the surface's crests 54 and troughs 56 of varying diameters can be consistently arranged along the length of the screen 50. However, these features can be at various lengths and spacings from one another asymmetrically or in desired patterns along the screen's length as discussed below.

Additionally, the changing diameter of the screen 50 can be increased and decreased for the needs of the application or the desired appearance of the screen 50. Finally, the wires 60 wrapped around the screen 50 can also change in adjacent spacing or gaps G to further meet the needs of a process or a desired appearance.

As noted above, typical wire screens have a diameter that is consistent along the length of the screen. In the current arrangement, however, having the diameter of the wire screen 50 change along the length of the screen 50 may be beneficial for aesthetic and industrial purposes. For aesthetic applications, for example, the undulating or curving outer skin 52 formed by the wire 60 can provide a variety of visual effects.

For industrial and downhole applications, the undulating or non-linear profile or surface 52 of the screen 50 can enhance filtering, screening, limiting, or other operations of a process flow. The screen 50 can also be designed to conform to a particular shape of a surrounding vessel (not shown), centerpipe, or other feature disposing inside or outside of the screen 50. Use of the screen 50 for a centerpipe for radial flow is but one example, as the disclosed screen 50 can be used in any number of applications, especially those applications in which consistency of the annular space (having a constant annular space) around the screen 50 is not needed or not even desired. Having the benefit of the present disclosure, therefore, one skilled in the art of either aesthetic or industrial applications for a wire screen will appreciate a number of uses for the disclosed screen 50 and its features as presented herein.

The screen's undulating or non-linear profile or surface 52 may also be useful for industrial and downhole applications to improve flow distribution (with internal modifiers) or to act as an actuator as well as a screen surface. In addition, the screen surface's undulation or profile can be used to maintain a consistent boundary when non-uniform surfaces are disposed relative to the screen 50 or where a non-uniform screen to surface spacing is desired. The varying height of the internal longitudinal rods 70 can also have structural benefits in screen applications where the surface loading varies along the screen's surface 52.

As discussed above, the rods 70 dispose longitudinally around the center C of the screen 50. FIGS. 5A-5D show additional examples of rods 70 that can be used in the construction of a screen as disclosed herein. In FIG. 5A, three example rods 70 each has an undulating or non-linear outer edge 72 and a uniform inner edge 75. The outer edges 72 are the ones to which the wire 60 affixes.

The variations in the outer edges 72 can be symmetrically or asymmetrically arranged. For the rods 70 of FIG. 5A, crests 74 and troughs 76 of the undulating edges 72 can vary in lateral and longitudinal extent along the length of the rods 70. They may be consistently laid out as show, or they may vary as they extend along the rod's length. In the example of FIG. 5B, the rod 70 has its outer edge 72 with a uniform pattern of alternating crests 74 and troughs 76. These various crests and troughs 74 and 76 run roughly equal in lateral extent to one another along the longitudinal length of the rod 70 (as indicated by the dashed line).

In FIG. 5C, the inner edge 75 also undulates as the outer edge 72 on the rod 70. It may follow the same pattern as the outer edge 72, although this is not strictly necessary. The profile or contour of the rod's edge 72 can be cut or formed into the rod 70 using any suitable process. For example, the variations in the rod's edge 72 can be formed by water jet cutting of a rectangular bar to produce the desired shape of the outer edge 72. In an alternative shown in FIG. 5C, the rod 70 can be bent into shape rather than being cut. This may be especially possible when the rod 70 is thinner. The outer wire 60 can still be continuously spiral wrapped about a set of such bent rods 70, but the rods 70 would be bent during the screen fabrication process rather than being cut to shape. In this way, a resulting screen (50) can be fabricated by using tooling that changes diameter (forces the rods 70 in and out) during the screen run process.

In FIGS. 5B-5C, the crests and troughs 74 and 76 have a lateral extent consistent with one another, although they need not be. For example, FIG. 5D shows the rod 70 with an asymmetrical pattern of alternating crests 74 and troughs 76 that vary in lateral extent (as indicated by the dashed line). Here, the various crests and troughs 74 and 76 also run equally with one another along the length of the rod 70 (as indicated by the separations S).

As an alternative, the various crests and troughs 74 and 76 can be spaced at different distances from one another. For example, FIG. 5E shows a rod 70 with an asymmetrical pattern of alternating crests 74 and troughs 76. Here, the crests 74 and troughs 76 can have different extents along the rod 70 so that they can be arranged at different separations $S_1$, $S_2$, $S_3$, etc. along the rod 70. With the benefit of the present disclosure, it will be appreciated that these and other patterns can be used on the rods 70 for various arrangements of the disclosed screen 50.

Although FIGS. 5A-5E show rods 70 that have a number of variations (i.e., crests 74 and troughs 76) along the undulating or profiled edge 72, it is possible for a given rod 70 to be used that has only one variation along its length. For example, such a rod 70 may have a singular crest or trough anywhere along the length of the rod 70, or the rod 70 may have an outward splay in the outer edge 72 toward one end of the rod 70.

Although the rods 70 are shown as rectangular bars, other shapes can be used. For example, the rods 70 can be cylindrical in which case the profiled edge 72 can form one side of the cylindrical rod 70. Moreover, the edges 72 of rectangular shaped rods 70 may be formed to be pointed or beveled, which may facilitate attachment of wire (60) to the rods' edges 72. Likewise, although the wires 60 discussed herein are shown having a triangular shape, any other suitable shape can be used. As such, both the rods 70 and wires 60 can have cylindrical, square, rectangular, triangular, or any other cross-sectional shape.

As discussed above, the one or more wires 60 dispose around the outside of the screen 50 to form the screen's surface 52, and gaps G can be provided between the wire 60 along the length of the screen 50. In general, the gaps G can be consistent and uniform along the length of the screen 50, or the gaps G can vary consistently or inconsistently along the length. Other features of the attachment of a wire 60 to a rod 70 can also be varied as now discussed.

For example, FIG. 6A shows wire 60 attached to an undulating or profiled edge 72 of a rod 70. Due to the profiled edge 72 of the rods 70 to which the wire 60 affixes, the wire wraps $61_1$, $61_2$, $61_3$ . . . are placed at different lateral distances $I_1$, $I_2$, $I_3$, etc. relative to the screen's centerline C diagrammatically shown. This difference in lateral distance $I_1$, $I_2$, $I_3$, etc. Finer differences can also be achieved by controlling the wire's position relative to the rod's edge 72 as the wire 60 is welded to the edge 72. During manufacture of the screen 50, a combination of the profiled edge 72 and wire positioning can therefore be used to provide explicit variations in the screen's surface 52 despite manufacturing differences and tolerances.

In FIG. 6A, the wire 60 has uniform spacing (d) between its various wraps $61_1$, $61_2$, $61_3$ . . . where the wire 60 attaches to the edge 72 so that the resulting gaps G may be consistent with one another. Additionally, each wrap $61_1$, $61_2$, $61_3$ . . . has the same orientation relative to the length of the rod 70. As shown, for example, each wrap $61_1$, $61_2$, $61_3$ . . . is affixed perpendicular to the length of the rod 70 so that each is roughly horizontal in orientation in this illustration.

However, other spacings and orientations can be used. For example, FIG. 6B shows wrap $61_1$, $61_2$, $61_3$ . . . of wire 60 having a non-perpendicular orientation (angle α) relative to the screen's centerline C diagrammatically shown. Yet, each wrap $61_1$, $61_2$, $61_3$ . . . still has the same orientation (a) and spacing (d) as one another.

In another example, FIG. 6C shows wrap $61_1$, $61_2$, $61_3$ . . . of wire 60 having differing spacings $d_1$, $d_2$, $d_3$, etc. along the edge 72 of the rod 70. The differing spacings $d_1$, $d_2$, $d_3$, etc. can follow the undulation or profile in the rod 70 so that greater spacings are given at the edge's troughs 76 while narrower spacings are given at the edge's crests 74. The reverse spacing arrangement or any variation thereof could also be used. As also shown, each wrap $61_1$, $61_2$, $61_3$ . . . can again have the same orientation relative to the screen's centerline C (e.g., perpendicular to the centerline), although differing orientations can also be used.

As a final example, FIG. 6D again shows wire 60 attached to the profiled edge 72 of the rod 70. In this example, each wrap $61_1$, $61_2$, $61_3$ . . . has differing angular orientations $α_1$, $α_2$, $α_3$, etc. relative to the centerline C. Again, these differences in orientation (α) may or may not follow the undulation or profile of the edge 72 and may or may not be uniform along the length of the rod 70, depending on the implementation. Finally, each wrap $61_1$, $61_2$, $61_3$ . . . has the same spacing (d), although differing spacings could also be used.

With the benefit of the above examples, it will therefore be appreciated that the disclosed screen 50 can use these and other arrangements of spacings and orientations of the wire's wraps 61 depending on the industrial or aesthetic application.

Figure 7A:
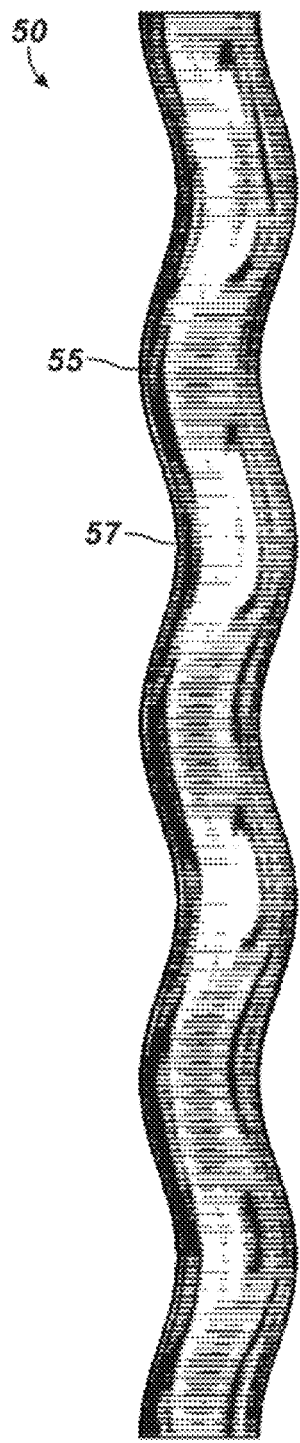
FIGS. 7A-7C show elevational, perspective, and end views of a wire screen having variable diameters that are offset from the screen's centerline.
Figure 7C:
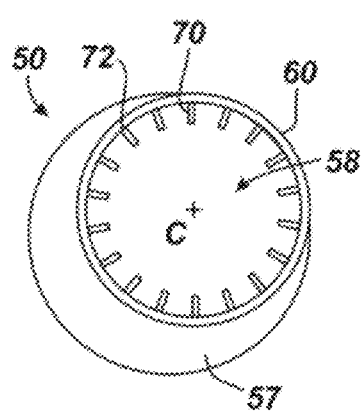
Figure 7B:
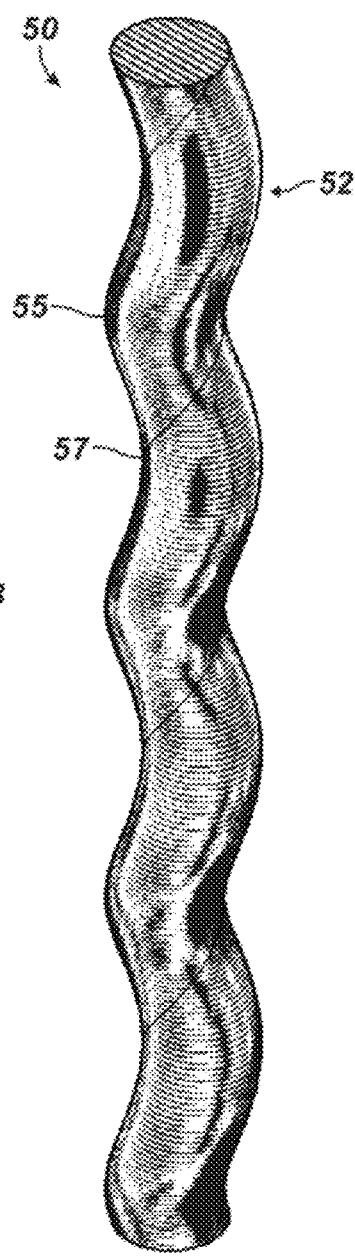

In the previous arrangements of the screen 50 as in FIG. 3A-3D, the various rods 70 longitudinally arranged about the centerline C have all been the same as each other. In this way, the various changes in diameter $D_1$, $D_2$, etc. along the length of the screen 50 are uniform and consistent. As an alternative, the various rods 70 disposed around the centerline C can have different profiled edges 72 and orientations from one another. For example, FIGS. 7A-7C show a wire screen 50 in which the various rods 70 disposed about the screen's centerline C have offset and varying profiles along their outer edges 72. This produces an asymmetrical offset of crests 55 and troughs 57 around the screen's surface 52 and can also produce spiraling features on the screen's surface 52 as shown.

Figure 8B:
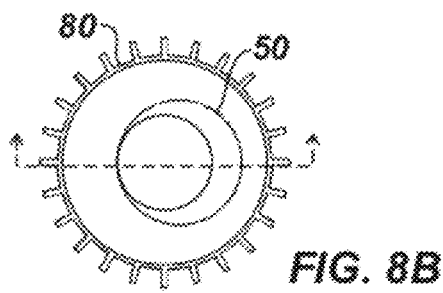
FIGS. 8A-8B show side and end views of a variable diameter offset screen as in FIGS. 7A-7C disposed inside a surrounding screen.
Figure 8A:
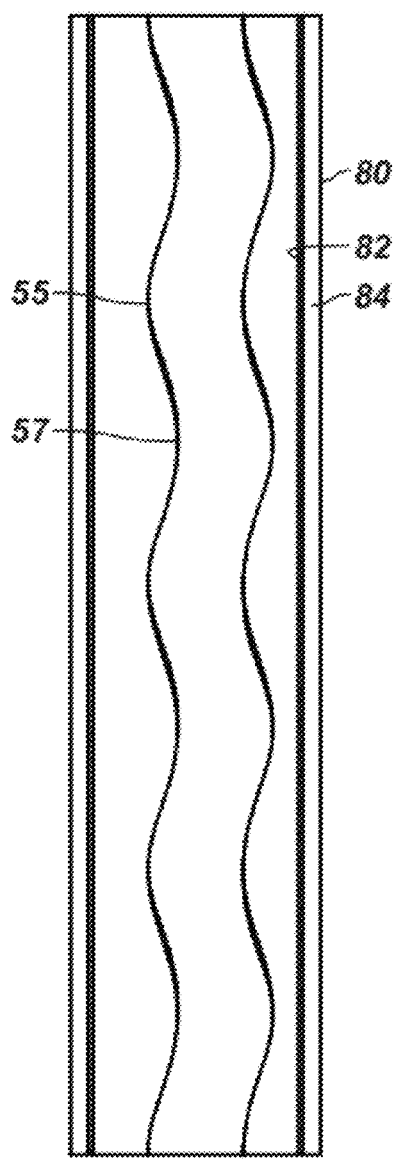

A screen 50 as disclosed herein may be used alone or in combination with another screen. For example, FIGS. 8A-8B show an asymmetrical variable diameter screen 50 disposed inside another screen 80. This external screen 80 can have wire 82 and ribs 84 and may be cylindrical as shown or any other desired shape. The asymmetric screen 50 can be disposed concentric to the external screen 80 as shown, or they can be non-concentrically arranged. A reverse arrangement can also be used in which the asymmetrical variable diameter screen 50 has another screen (not shown) disposed inside.

Figure 9:
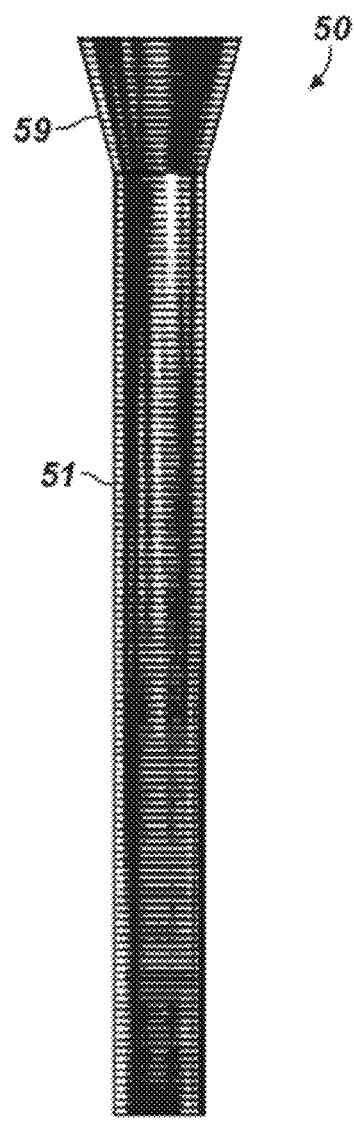
FIG. 9 shows a screen having an expanding variable diameter on one end thereof.

As noted above, a screen 50 as disclosed herein need not have multiple variations. For example, FIG. 9 shows a screen 50 having only one variation along its longitudinal length. As discussed above, the rods (70) disposed in such a screen 50 may have one change in the profiles of their outer edges (72). In this instance, the variation includes an expanding variable diameter 59 at the end of the screen 50, which has a generally cylindrical surface 51 for the remainder of its length. Other variations are possible, including a more gradual increase in diameter as opposed to the abrupt change depicted in FIG. 9.

As noted above, the rods 70 disclosed herein can have variations such as crests and troughs, but the variations do not need to be consistently or uniformly arranged on all of the rods 70 for the screen 50. For example, FIGS. 10A-10E show a screen 50 having a bulged variation 52 that rotates or switches radially along the longitudinal length of the screen 50. FIGS. 10A-10C shows an elevational, a perspective, and an end view of the screen 50. FIG. 10D shows an end-section of the screen 50 revealing the internal passage 58 and the wire 60 wound about the rods 70. FIG. 10E shows the shape of one of the rods 70 with its profiled edge 72 having winds of wire 60 affixed thereto. As can be seen, most of the screen's outer surface 52 is cylindrical except for the extension of the elliptical lobe or bulge 53 that shifts continuously or at some desired angle (e.g., 90 degrees) along the length of the screen 50. This creates a corkscrew shape to the screen's surface 52.

Figure 11B:
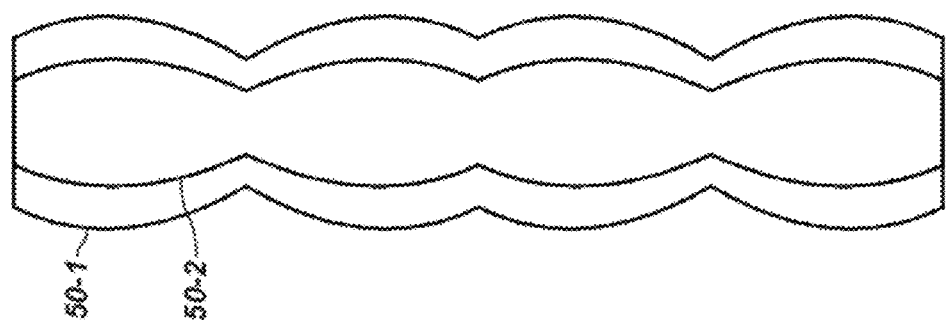
FIG. 11B shows a variable diameter screen as in FIG. 11A disposed inside another variable diameter screen.
Figure 11A:
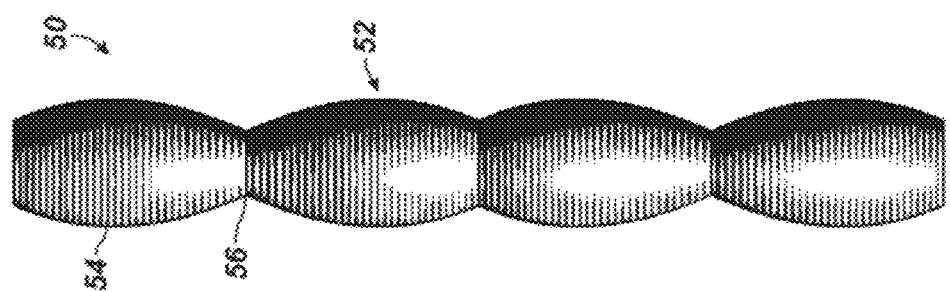
FIG. 11A shows a screen having variable pitch and diameter along its longitudinal length.

In another example, FIG. 11A shows a screen 50 having a variable pitch and diameter achieved by the profiled edges (72) of the rods 70 disposed around the inside of the screen 50. As shown, the distances between the changes in diameters do not need to be consistent along the length of the screen 50 so that the various crests 54 and troughs 56 can be asymmetrically arranged. Of course, a more consistent arrangement could be used.

FIG. 11B shows how one variable diameter screen 50-1 as in FIG. 11A can be disposed inside another variable diameter screen 50-2. As will be appreciated, various forms of screens can be disposed inside or outside of other screens depending on the aesthetic or industrial application. The benefit of the few examples here will indicate to one skilled in the art that a number of other combinations of screen inside screen could be used.

Figure 12:
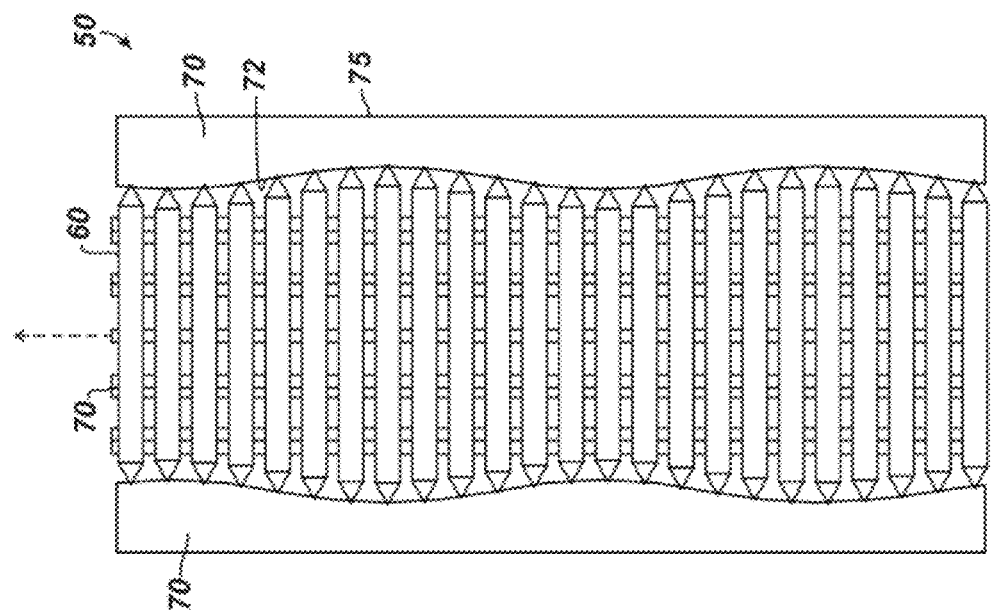
FIG. 12 shows a cross-section of an inverted screen having external ribs and internally wrapped wire.

In above examples, the disclosed screen 50 has the lateral wire 60 wound around the outside of the longitudinal rods 70. An inverted arrangement can also be used for a screen 50 as shown in FIG. 12, for example. Here, the wire 60 winds internally to the rods 70 as opposed to being on the outside. This screen 50 can be manufactured by constructing the previous screen (i.e., 50 in FIG. 3A) with the wire 60 outside the rods 70. Once constructed, the cylindrical body of the screen (50) can be split longitudinally along one side across the wire 60 and between rods 70. The entire assembly can then be inverted inside-out, and the cut ends of the wire 60 can be reaffixed back together by welding or the like. Of course, other forms of construction could be used.

Figure 13A:
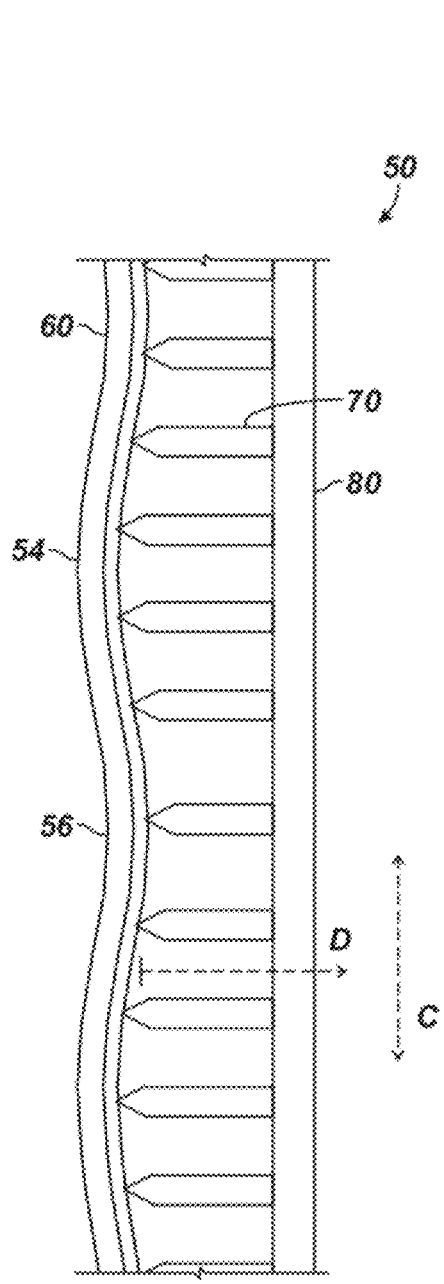
FIGS. 13A-13C show views of screens having a stacked arrangement of ribs or rings and having longitudinally arranged wires that undulate along the length of the screen.
Figures 1, 13B:
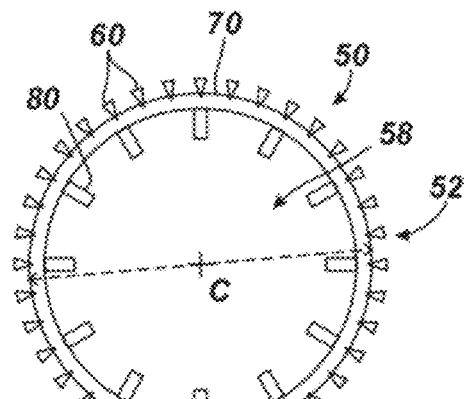
Figures 2, 13B:
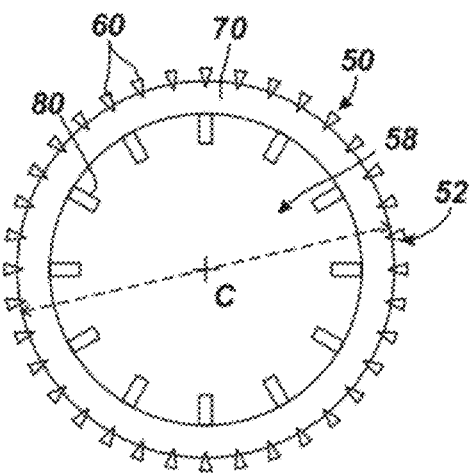
Figure 13C:
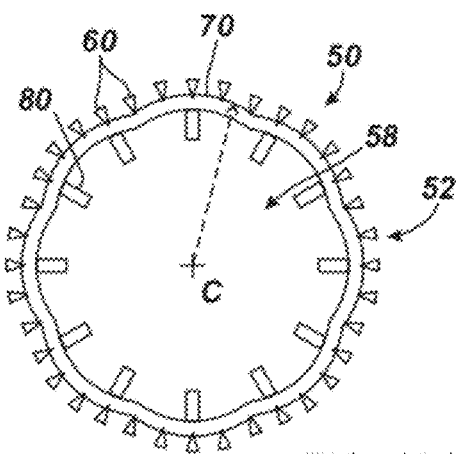

In above examples, the disclosed screen 50 has longitudinal rods 70 and lateral wire 60 wound thereabout. An opposite arrangement can also be used on a screen 50 as shown in FIGS. 13A-13C. Here, the screen 50 has lateral rods or rings 70 with varying diameters (D). Wires 60 run longitudinally along the outside rims of the rings 70 and affix by welding or the like. If necessary, additional support ribs 80 can be provided for the lateral rings 70.

Figure 1:
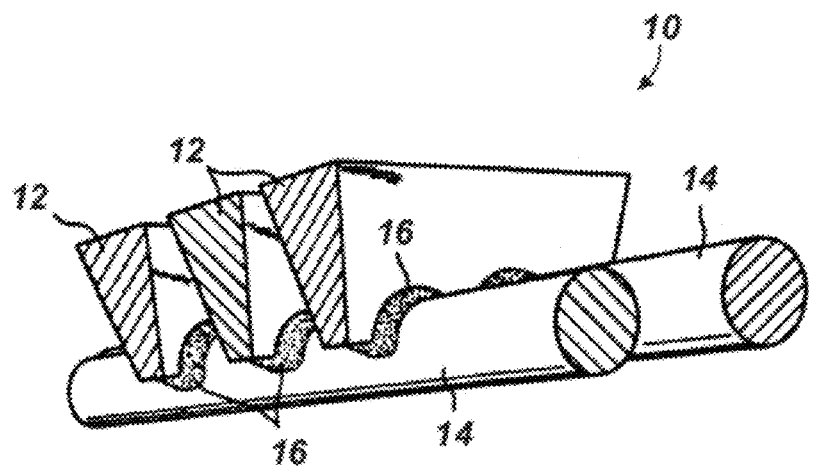
FIG. 1 illustrates a typical construction of a prior art wire screen.
Figure 2:
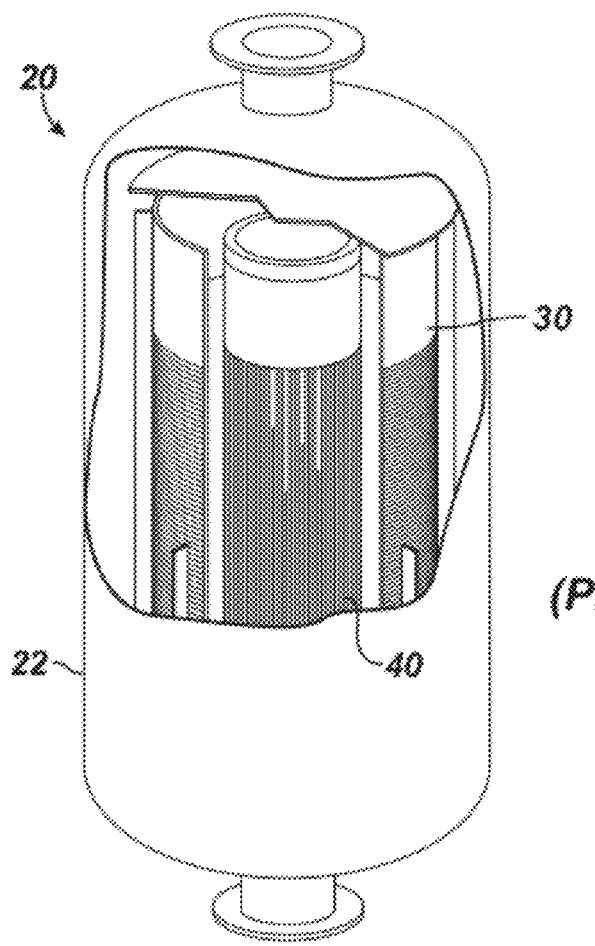
FIG. 2 shows an example of a typical radial flow reactor vessel 10 for a chemical processing system.

For this screen 50, the rods 70 are arranged along a central axis C of the screen 50 so that the rods 70 circumscribe the central axis C of the screen 50. Again, each rod 70 has first and second edges 72 and 75. Each of the outer edges 72 have either a uniform (i.e., circular) profile or a non-uniform (i.e., non-circular) profile. For circular profiles, the rods 70 at different longitudinal distances along the screen 50 can have different diameters as shown in FIGS. 13B-1 and 13B-2. These rods 70 can be concentrically stacked in like manner along the length of the screen 50, or they can be offset (i.e., moved off center from the central axis C) to alter the resulting shape of the screen surface 52.

For the non-circular profiled rods 70 as shown in FIG. 13C, each rod 70 varies in lateral distances from the central axis C along a perimeter of the rod 70 (and hence around the perimeter of the screen 50). These rods 70 can be stacked in the same radial orientation and/or concentrically along the length of the screen 50, or they can be offset (i.e., rotated relative to the central axis C and/or moved off center from the central axis) to alter the resulting shape of the screen surface 50. In both cases of FIGS. 13B-13C, wires 60 dispose longitudinally around the central axis C and attach to the edges of the rods 70. In this way, the wires 60 define a plurality of longitudinal gaps between them and form the screen surface 52.

Constructing this screen 50 can involve building an internal cage or frame of the rods 70 and ribs 80. The wires 60 can then be formed to fit onto this internal structure and affixed by welding. Construction can form the screen 50 with the wires 60 on the outside of the rods 70, then splitting and rolling the screen so that the wires face inward, and finally welding or otherwise attaching the cut seam.

In the present disclosure, the wires 60 and rods 70 of the screen 50 can be composed of 304, 316, or 321 stainless steel, although other metals may be used. Suitable wires and rods are available from Johnson Screens. In addition, the wires 60 can attach to the rods 70 and the assembly can be formed into a cylindrical, tubular, or other shape using techniques such as disclosed in U.S. Pat. Nos. 2,046,458; 4,096,911; 4,276,265; 5,015,383; 5,118,419; and 6,785,964, which are incorporated herein by reference in their entireties.

Figure 14A:
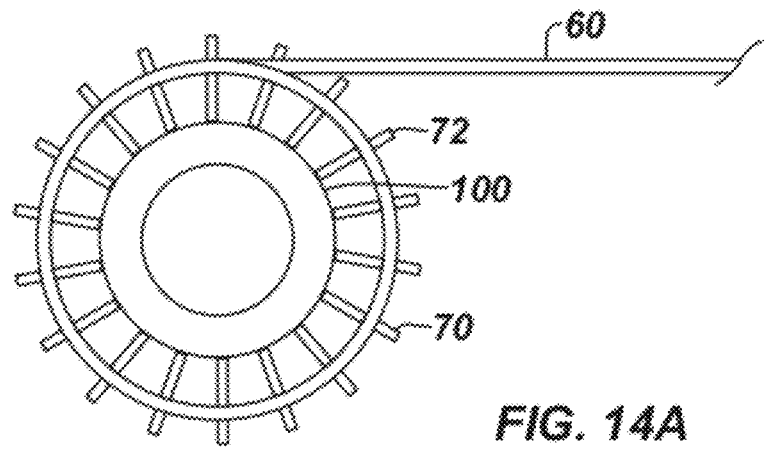
FIGS. 14A-14B show details of one technique for constructing a cylindrically shaped screen according to the present disclosure.
Figure 14B:
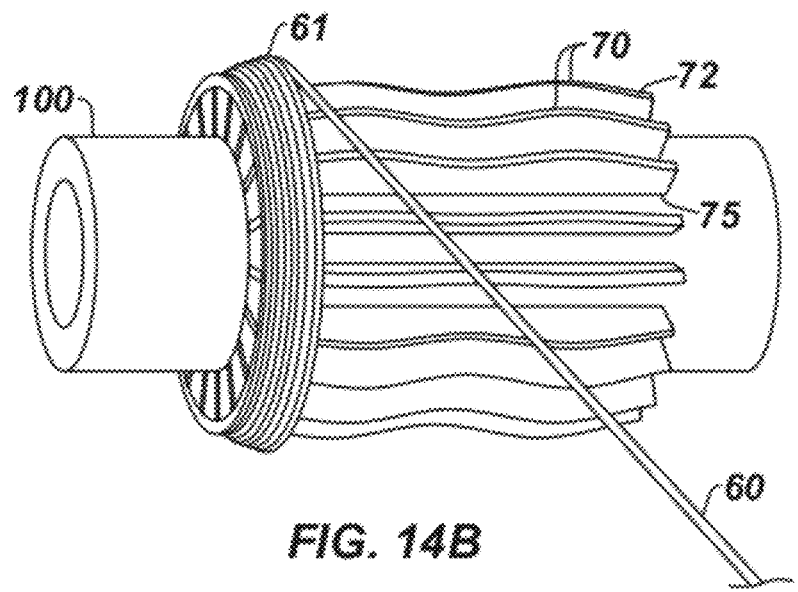
Figure 15:
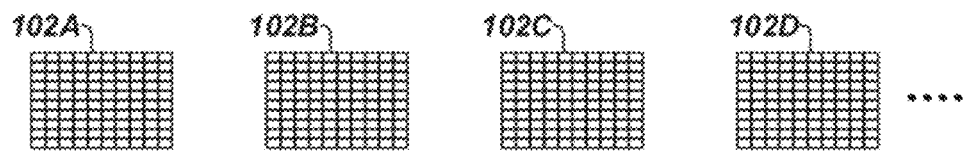
FIGS. 15-19 show details of another technique for constructing a cylindrically shaped screen according to the present disclosure.

A number of techniques can be used to form a screen 50 as disclosed herein. In one technique shown in FIGS. 14A-14B, for example, the rods 70 can be arranged around the central axis C on a cylindrical mandrel 100. Again, as noted above, inner edges 75 of the rods 70 can be linear and can fit against or attach to the surface of the mandrel 100. When the inner edges 75 of the rods 70 are profiled, the mandrel 100 may include an additional sleeve (not shown) with a corresponding profile shape on which the rods 70 are positioned and pressed into their desired shape.

To create a screen 50 with laterally arranged wire 60 along the length of the assembly, operators use a conventional wire-winding machine that either rotates the mandrel 100 relative to the wire 60 or rotates the wire 60 around the mandrel 100. For example, the wire-winding machine winds the wire 60 around the rods 70 by rotating the mandrel 100 so the wire 60 can be resistances welded to the rods 70. As the wire is fed, it wraps cylindrically around the assembly of inner rods 70 and spirals up the length of the rods 70 to form the screen 50.

Because the profiled edges 72 of the rods 70 vary, the wrapping of the wire 60 may need to account for such variations. Therefore, the mandrel 100 may be adjusted up and down relative to the feeding of the wire 60 so that the angle at which the wire 60 meets the rods 70 can remain consistent. Alternatively, the feed of the wire 60 may be adjusted up and down relative to the mandrel 100.

Use of the wire winding machine as in the above technique can be suitable for smaller screens, such as downhole wellscreens used in production of hydrocarbons. The mandrel 100 may or may not be removed, as it may actually form part of a final component, such as a gravel pack screen or the like.

In another technique shown in FIGS. 15 through 19, for example, one or more planar screen panels 102A, 102B . . . can be formed by attaching wires 60 to the rods 70 while arranged in a plane. Starting in FIG. 15, for example, assemblers create the plurality of planar screen panels 102A, 102B . . . having the wires 60 and rods 70 as discussed above. Assemblers then splice together adjoining ends of adjacent screen panels 102A, 102B . . . As shown in FIG. 16A, for example, the free ends of the wires 60 on the panels (i.e., 102A and 102B shown) can be spliced together with welds 104 to connect the various panels 102A, 102B . . . together in an elongated sheet. (Because the wires 60 are adjoined, the resulting cylindrically shaped screen detailed below will have the rods 60 running longitudinally and will have the wires 70 running laterally about the screen's central axis, as in FIGS. 3A-3B, for example).

Figure 16A:
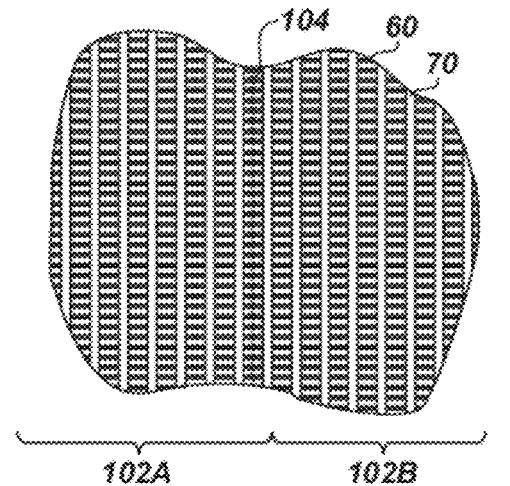
Figure 16B:
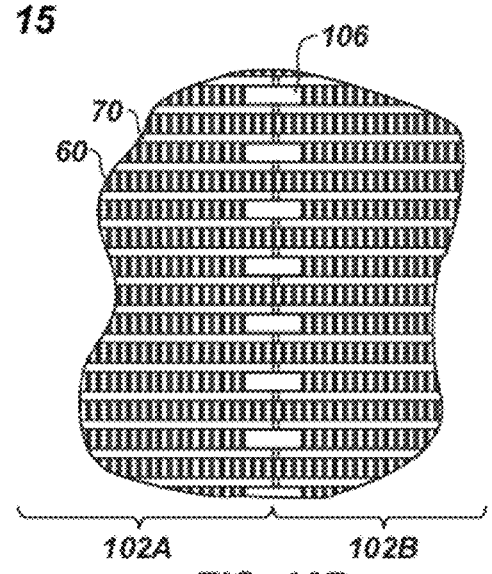

Alternatively, as shown in FIG. 16B, splice bars 106 can be used to connect the free ends of the support rods 70 on adjoining panels. One suitable splicing technique is disclosed in U.S. Pat. Pub. No. 2009/0211965, which is incorporated herein by reference. To use the bars 106, assemblers abut the panels' free ends together and weld the splice bars 106 alternatingly between adjacent ones of the rods 70 at the joint between panels (e.g., 102A and 102B). (Because the rods 70 are adjoined, the resulting cylindrically shaped screen detailed below will have the rods 70 running laterally and the wires 60 running longitudinally about the central axis, as in FIGS. 13A-13B, for example.)

Figure 17:
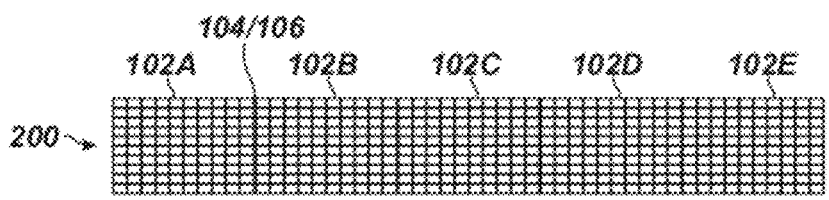

The splicing of adjoining ends of the screen panels 102A-D is repeated for several such panels 102A, 102B . . . until assemblers make an elongated sheet 200 as shown in FIG. 17. The elongated sheet 200 has an overall length of the desired circumference of the cylindrically shaped screen to be formed. When enough panels 102A, 102B, . . . are connected together to make up the desired circumference, the sheet 200 of the connected panels 102A-E is then rolled using rolling procedures known in the art. Because the rods 70 have profiled edges 72, rolling of the sheet 200 into the cylindrical shape may require a complimentary shape to support the bending of the wires 60. This may especially be when the profiled edges 72 of the rods 70 are to face outward on the resulting screen.

Figure 18:
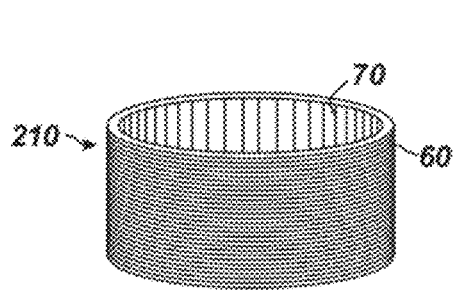
Figure 19:
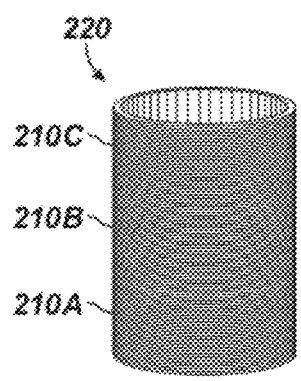

After performing the rolling process, the elongated sheet 200 has been rolled into a cylindrically shaped screen 210 as shown in FIG. 18, and the two free ends of the rolled sheet 210 are spliced together by connecting the ends of the wires 60 or by using the splice bars 106 on adjoining ends of the rods 70 depending on the arrangement as discussed above. Depending on the desired arrangement, the sheet 210 may be rolled with the wider ends of the wires 60 positioned on the inner or outer diameter of the resulting cylindrically shaped screen 210. Although the screen 210 of FIG. 18 may be formed to have any desired height, additional cylindrically shaped screens 210A-C can be created in the same manner and stacked together using techniques known in the art to form a longer cylindrically shaped screen 220 such as shown in FIG. 19.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A screen, comprising:
   a plurality of rods having a longitudinal length and having first and second edges, the rods arranged longitudinally around a central axis, one or more of the first edges having a non-linear profile, the non-linear profile varying in lateral distances from the central axis along the longitudinal length of the rod; and
   one or more wires wrapped laterally in a plurality of wraps around the central axis and attached to the first edges of the rods, the plurality of wraps defining a plurality of gaps between the wraps and forming a screen surface of the screen having a perimeter perpendicular to the longitudinal length,
   wherein the distance to the screen surface from the central axis at a first location along the central axis differs from the distance to the screen surface from the central axis at a different, second location along the central axis, and
   wherein the non-linear profile of the plurality of rods comprises a plurality of crests and troughs undulating in the lateral distances from the central axis such that the screen defines a curved surface along the longitudinal length and around the perimeter.

2. The screen of claim 1, wherein the crests and troughs of the first edges are arranged at same longitudinal distances as one another, whereby the screen surface defines a waved surface.

3. A screen, comprising:
   a plurality of rods having a longitudinal length and having first and second edges, the rods arranged longitudinally around a central axis, one or more of the first edges having a non-linear profile, the non-linear profile varying in lateral distances from the central axis along the longitudinal length of the rod; and
   one or more wires wrapped laterally in a plurality of wraps around the central axis and attached to the first edges of the rods, the plurality of wraps defining a plurality of gaps between the wraps and forming a screen surface of the screen,
   wherein the distance to the screen surface from the central axis at a first location along the central axis differs from the distance to the screen surface from the central axis at a different, second location along the central axis,
   wherein the non-linear profile of the plurality of rods comprises a plurality of crests and troughs undulating in the lateral distances from the central axis, and
   wherein the crests and troughs of the first edges of certain ones of the rods are arranged at differing longitudinal distances relative to the crests and troughs of the first edges of certain other rods, whereby the screen surface defines a spiraling surface.

4. The screen of claim 1, wherein the non-linear profile of a given one of the rods comprises one or more of:
   each of the crests defining same lateral distances as the other crests;
   one or more of the crests defining different lateral distances compared to the other crests;
   each of the troughs defining same lateral distances as the other troughs; and
   one or more of the troughs defining a different lateral distance compared to the other troughs.

5. The screen of claim 1, wherein the second edge of one or more of the rods comprises a linear profile along the longitudinal length of the rod.

6. The screen of claim 1, wherein the gaps formed by the wraps are consistent or vary along a length of the screen.

7. The screen of claim 6, wherein the variation of the gaps varies symmetrically or asymmetrically with the varying lateral distances of the profiles of the rods.

8. The screen of claim 1, wherein each of the one or more wires attaches to the first edges of the rods in a consistent or varying angular orientation.

9. The screen of claim 8, wherein the varying angular orientation varies symmetrically or asymmetrically along the longitudinal length of the screen.

10. The screen of claim 1, wherein the first edges of the rods are oriented toward or away from the central axis of the screen.

11. The screen of claim 1, wherein each of the non-linear profiles on the first edges of the one or more rods differs from rod to rod around the central axis of the screen.

12. The screen of claim 1, further comprising a second screen disposed inside or outside of the screen.

13. A screen, comprising:
a plurality of rods arranged along a longitudinal length of the screen, each rod forming a ring in a plane substantially perpendicular to a central axis of the screen and having a first edge on the outside surface of the rod, away from the central axis, and a second edge on the inside surface of the rod, facing the central axis, one or more of the first edges having a non-circular profile, the non-circular profile varying in radial distances from the central axis around a perimeter of the screen; and
a plurality of wires disposed longitudinally around the central axis and attached to the first edges of the rods, the plurality of wires defining a plurality of gaps therebetween and forming a screen surface of the screen on the side of the wires away from the central axis, wherein the screen surface is non-circular in the planes perpendicular to the central axis.

14. A screen, comprising:
a plurality of rods arranged along a longitudinal length of the screen, each rod forming a circular ring in a plane substantially perpendicular to a central axis of the screen, each ring having an outside circumference and an outside diameter, the outside diameter of one or more of the rings being different from the outside diameter of other rings; and
a plurality of wires disposed longitudinally around the central axis and attached to the outside circumference of the rings, the plurality of wires defining a plurality of gaps therebetween and forming a screen surface of the screen, wherein the longitudinally disposed wires form a non-linear profile such that the screen defines a curved surface along the longitudinal length.

15. A method of forming a screen, comprising:
arranging a plurality of rods having a longitudinal length and having first and second edges, the rods arranged longitudinally around a central axis, one or more of the first edges having a non-linear profile, the non-linear profile varying in lateral distances from the central axis along the longitudinal length of each rod;
disposing one or more of the first edges of one or more of the rods with one or more non-uniform profiles varying along the one or more first edges relative to the axis; and
forming a screen surface by attaching one or more wires to the first edges of the rods, wherein the one or more wires are wrapped laterally in a plurality of wraps around the central axis and attached to the first edges of the rods, the one or more wires each having an outer surface most distant from the central axis, the plurality of wraps defining a plurality of gaps between the wraps and forming a screen surface of the screen having a perimeter perpendicular to the longitudinal length,
wherein the distance to the outer surface from the central axis at a first location along the central axis differs from the distance to the outer surface from the central axis at a different, second location along the central axis, and
wherein the non-linear profile of the plurality of rods comprises a plurality of crests and troughs undulating in the lateral distances from the central axis such that the screen defines a curved surface along the longitudinal length and around the perimeter.

16. The method of claim 15, further comprising defining the one or more non-uniform profiles of the one or more first edges on the one or more rods.

17. The method of claim 16, wherein defining the one or more non-uniform profiles comprises bending the one or more rods.

18. The method of claim 15, wherein defining the one or more non-uniform profiles comprises cutting the one or more rods.

19. The method of claim 15, wherein forming the screen comprises:
arranging the rods in a plane;
attaching the one or more wires to the rods arranged in the plane; and
rolling the rods with attached one or more wires into a cylindrical shape around the axis.

20. The method of claim 15, wherein forming the screen comprises: arranging the rods longitudinally around the axis; and wrapping the one or more wires laterally around the rods.

* * * * *